Patented Oct. 12, 1926.

1,603,086

UNITED STATES PATENT OFFICE.

PERCIL CHARLES McKEE, OF CHICAGO, ILLINOIS, ASSIGNOR TO CLARENCE D. RANDALL, OF CHICAGO, ILLINOIS.

LUBRICANT.

No Drawing.      Application filed May 9, 1925. Serial No. 29,229.

My invention relates to lubricants, more particularly to a greaseless lubricant embodying graphite.

It is among the objects of my invention to provide a lubricant which shall be applicable especially, where the accessibility to the parts requiring lubrication is difficult.

Another object of my invention is to provide a lubricant which shall be applied in viscous form and which shall have the properties of solidifying by air-drying to produce a hard anti-friction wearing surface.

Another object of my invention is to provide a lubricant having the characteristic to withstand a relatively high degree of heat without decomposing and which shall be non-hygroscopic and impervious to atmospheric conditions.

Another object of my invention is to provide a lubricant which shall produce a film of any desired thickness which shall be capable of maintaining relatively high pressures to sustain heavy loads and which shall withstand such loads irrespective of the thickness of the film section.

Other objects of my invention will be apparent from the description thereof and the appended claims.

Various forms of lubricants comprising grease or oils having graphite in suspension have been heretofore proposed for lubricating bearings, axles, springs and the like, the objects of the graphite being to provide a smooth running surface for some time after the grease becomes dry. Graphite has also been utilized in solid form in shapes of bushings which are cast molded or machined to fit the bearing housing and the journal member. These lubricants serve well the purpose for which they are intended but where oilless or greaseless bearings are desired, the utilization of graphite bushings is very expensive and because of the brittle nature thereof, result in frequent breakage.

My present invention is directed to a lubricant which is particularly applicable as a greaseless and oilless substance which may be used where the solid graphite bearings have been heretofore utilized. It may also be employed where the journals or journal bearings are materially worn to take up the worn part and provide a substantially solid bearing.

It has long been recognized that when a journalled part has become slightly worn, it will rapidly deteriorate because its normal free running characteristics are changed to vibration and resonance, thus producing a pounding action on the bearings which results in pitting and erosion. My lubricant being of a viscous nature, may be forced into the bearing member to take up the space caused by wear and upon its solidification will provide a solid support as effectively as a bushing with the additional advantage that it constitutes an anti-friction support.

In carrying out my invention, I utilize a mixture of unwashed celluloid which is scrap picture film comprising celluloid coated with a gelatine containing silver. I dissolve the celluloid with acetone to reduce it to a liquid state. Instead of using acetone, I may utilize a solution of equal parts of acetone and a mixture of equal parts of ether and alcohol to dissolve the celluloid. I utilize a sufficient quantity of the solvent for the unwashed celluloid to obtain a viscous liquid.

To a five gallon solution of unwashed celluloid and acetone, I add approximately a half pint amylacetate. Graphite flake is then added in the proportion of five pounds and gold bronze in the proportion of one-fourth ounce to five gallons of the latter solution. The gold bronze is of the ordinary commercial grade of radiator bronze comprising a copper, tin and zinc alloy. The mixture so formed may be applied as a lubricant in the manner heretofore described but if a heavy body of lubricant is desired, a filler material of vulcanized fiber chips or wood chips may be thoroughly stirred into the mixture in the proportion of approximately two quarts of filler to five gallons of unwashed celluloid and acetone. Alcohol may be used as a solvent to reduce the viscosity if desired, depending upon the manner in which the lubricant is to be applied. The gold bronze has a dual function of precipitating the graphite and holding it in solution thus preventing settlement and further the gold bronze is a hardening agent which increases the hardness of the lubricant after it has solidified.

A five gallon mixture of my lubricant contains substantially five pounds of gelatine and a varying quantity of silver, these elements being present in the film scrap.

The gelatine provides the adhesive quality to the lubricant in its liquid state and the silver is a hardening agent.

I have found that a lubricant so formed has many desirable qualities and many applications, some of which are its application between the superposed layers of spring material of vehicle springs or the like, also for journal bearings, axle bearings and pad bearings of railway vehicles or it may be applied to oilless bearings by allowing the proper provision of clearance between the co-operating parts to receive a substantial amount of lubricant. The lubricant when applied dries very rapidly and forms a hard and tough film bushing or layer which is capable of sustaining relatively heavy loads.

I have found that this mixture can also be advantageously utilized for sealing pipe joints as it is sanitary, non-hygroscopic, not readily affected by heat up to 150° C. and because of its rapid solidifying qualities. When used in this manner the fiber or wood chips should be omitted.

It is evident from the foregoing description of my invention that the lubricant made in accordance therewith provides simple and efficient means for lubricating bearings, springs and other co-operating surfaces of movable objects and further provides a renewal element where such parts have been excessively worn.

Although I have described a specific embodiment of my invention, it will be obvious to those skilled in the art that other materials may be utilized in the process of making the lubricant or these materials may be employed in different proportions and the lubricant so formed may be utilized in other ways than those herein described without departing from the principles herein set forth.

I claim as my invention:

1. A lubricant comprising a mixture of acetone, film scrap, amylacetate and graphite.

2. A lubricant comprising a mixture of acetone, film scrap, amylacetate, graphite, gold bronze, filler and an alcohol solvent to produce a mixture of the desired viscosity.

3. A lubricant comprising a mixture of acetone, film scrap, amylacetate, graphite, and gold bronze.

4. A lubricant comprising a mixture of film scrap consisting of celluloid coated with gelatine and silver, acetone, amylacetate, graphite, and gold bronze.

5. The method of making lubricating material which comprises, mixing film scrap with acetone to dissolve the celluloid adding amylacetate in the proportion of one-half pint to five gallons of the mixture, and adding one pound of graphite for each gallon, and one-fourth ounce of gold bronze to five gallons of the mixture.

6. A lubricant comprising a mixture of five pounds celluloid, a half pint amylacetate, five gallons acetone, five pounds graphite, one quarter ounce gold bronze and a variable quantity of silver in solution.

In testimony whereof, I have hereunto subscribed my name this 5th day of May 1925.

PERCIL CHARLES McKEE.